United States Patent [19]
Klein et al.

[11] Patent Number: 5,729,375
[45] Date of Patent: Mar. 17, 1998

[54] OPTICAL AMPLIFICATION SYSTEM WITH NON-ORTHOGONAL SIGNAL AND DISTRIBUTED MULTI-PUMP BEAMS AND PHOTOREFRACTIVE CLEANUP

[75] Inventors: Marvin B. Klein, Pacific Palisades; Barry Wechsler, Newbury Park; Jack L. Feinberg, Manhattan Beach; Stuart MacCormack, Venice, all of Calif.

[73] Assignees: Hughes Electronics, Los Angeles; University of Southern California, University Park, both of Calif.

[21] Appl. No.: 609,200

[22] Filed: Mar. 1, 1996

[51] Int. Cl.$^6$ .............................. H01S 3/08; G02B 5/23; G02F 1/01
[52] U.S. Cl. .............................. 359/244; 359/299
[58] Field of Search .............................. 359/241, 244, 359/299; 330/59; 372/21, 69

[56] References Cited

U.S. PATENT DOCUMENTS

| | | |
|---|---|---|
| 4,757,268 | 7/1988 | Abrams et al. . |
| 4,761,059 | 8/1988 | Yeh et al. .............................. 359/244 |
| 4,794,345 | 12/1988 | Linford et al. . |
| 4,831,333 | 5/1989 | Welch et al. . |
| 5,038,359 | 8/1991 | Pepper et al. .............................. 372/99 |
| 5,050,175 | 9/1991 | Ayral et al. . |
| 5,121,400 | 6/1992 | Verdiell et al. .............................. 372/32 |
| 5,130,849 | 7/1992 | Valley et al. .............................. 359/571 |
| 5,305,412 | 4/1994 | Paoli et al. . |
| 5,373,526 | 12/1994 | Lam et al. . |
| 5,430,748 | 7/1995 | MacCormack et al. .............................. 372/29 |
| 5,440,576 | 8/1995 | Welch et al. . |
| 5,539,847 | 7/1996 | Lerminiaux et al. . |

OTHER PUBLICATIONS

Chiou et al., "Beam cleanup using photorefractive two-wave mixing", *Optics Letters*, vol. 10, No. 12, pp. 621–623 (1985).

Chiou et al., "Laser-beam cleanup using photorefractive two-wave mixing and optical phase conjuugation", *Optics Letters*, vol. 11, No. 9, pp. 461–463 (1996).

Christian et al., "Laser beam cleanup at 830 nm", *Proceedings of the SPIE*, vol. 1060, pp. 113–118 (1989).

MacCormack et al., "Efficient amplification of a single-mode laser diode by photorefractive beam combination using an injection-locked diode laser array pump", *Optics Letters*, vol. 15, No. 21, pp. 1212–1214 (1990).

Christian et al., "Energy transfer between injection-locked single-mode diode lasers by two-beam coupling in BaTiO$_3$", *Optics Letters*, vol. 14, No. 1, pp. 81–83 (1989).

Beckwith et al., "Two-wave mixing and phase conjugation at 830 nm in BaTiO$_3$", *Optics Letters*, vol. 14, No. 12, pp. 642–644 (1989).

Verdiell et al., "Efficient Diffraction-Limited Beam Combining of Semiconductor Laser Diode Arrays Using Photorefractive BaTiO$_3$", *IEEE Photonics Technology Letters*, vol. 2, No. 8, pp. 568–570 (1990).

Lambelet et al., "Novel Configuration of Two-Wave Mixing of Laser-Diode Radiation in Cobalt-Doped BaTiO$_3$", *IEEE Photonics Technology Letters*, vol. 4, No. 9, pp. 1041–1043 (1992).

(List continued on next page.)

*Primary Examiner*—Nelson Moskowitz
*Attorney, Agent, or Firm*—V. D. Duraiswamy; W. K. Denson-Low

[57] ABSTRACT

An optical amplification system directs a diffraction-limited signal beam through a series of crossings, at substantially less than 90° crossing angles, with a number of non-diffraction-limited pump beams in a photorefractive medium. The pump beams are e-polarized while the signal beam travels down the crystal medium's c-axis and is polarized in the same plane as the pump beam polarization, resulting in an energy transfer from the pumps to the signal beam while leaving the signal beam diffraction-limited. The photorefractive medium is preferably a series of BaTiO$_3$:Rh crystals that are aligned parallel to the angled edge of a wedged-shape prism through which the pump beams are transmitted, with the crystals cut so that their C-axes are parallel to the signal beam.

36 Claims, 3 Drawing Sheets

OTHER PUBLICATIONS

MacCormack et al., "Sequential power transfer between stripes of a diode laser array via photorefractive two-wave mixing in BaTiO₃", *Journal of Applied Physics*, vol. 67, No. 11, pp. 7160–7162 (1990).

Wechsler, et al. "Spectroscopic and Photorefractive Properties of Infrared-sensitive Rhodium-doped Barium Titanate", Optics Letters, vol. 19, No. 8, pp. 536–538, (Apr. 15, 1994).

McNamara, et al., *"Fixing and IR Response of Doped Barium Titanate"* SPIE Critical Review Proceedings, vol. CR–48, P. Yeh and C. Gu, ed., (1994) pp. 100–120.

Brignon, et al., *"Very high-gain two-wave mixing in a BaTiO₃ with a self-bent pump beam"* Optics Letters, vol. 20, No. 16, (Aug. 15, 1995).

Sanders, et al., *"High power coherent two-dimensional semiconductor laser array"* Appl. Phys. Lett. 64, vol. 12, pp. 1478–1480.

Ehlert, et al., *"Automated phase sensing and control of an external Talbot cavity laser with phase-contrast imaging"* Applied Optics, vol. 33, No. 24, (Aug. 20, 1994) 5550–5556.

Carlson et al, Applied Physics Letters, vol. 56, pp. 114–116, 1990.

Verdiell et al, IEEE Photonics Technical. Lett., vol. 2, #8, pp. 568–570, Aug. 1990; abst .only herewith.

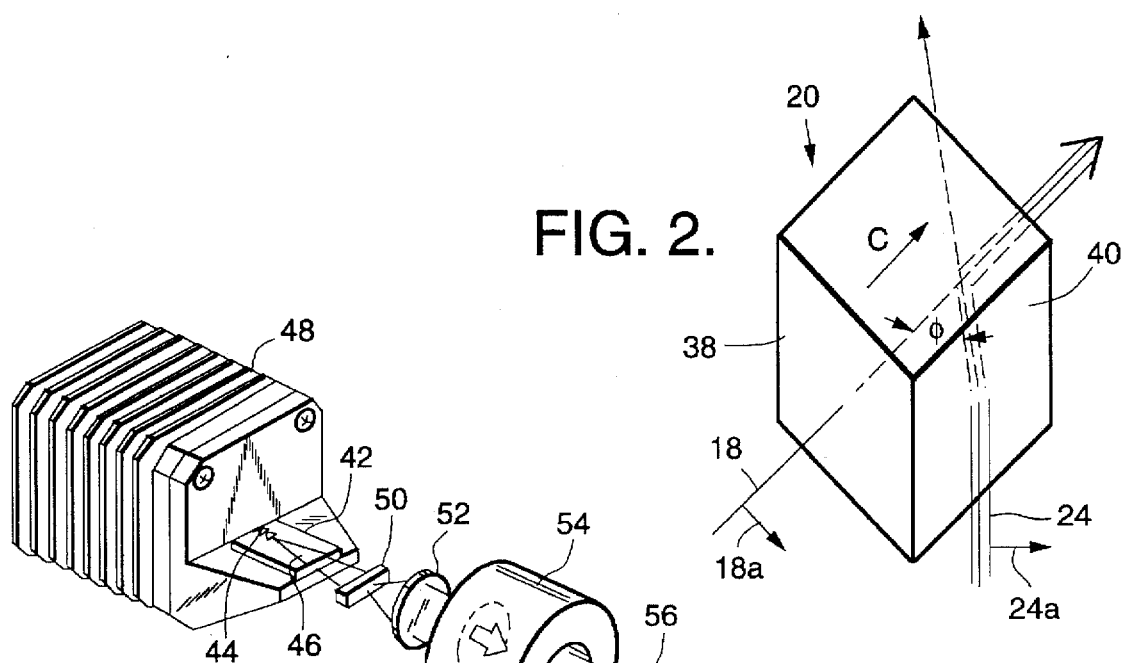
FIG. 2.
FIG. 3.
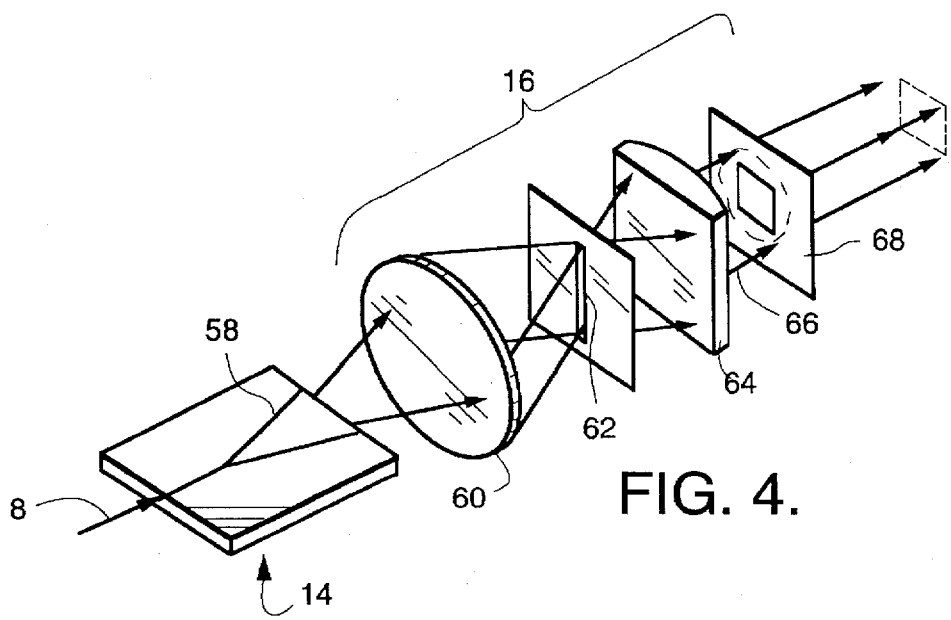
FIG. 4.

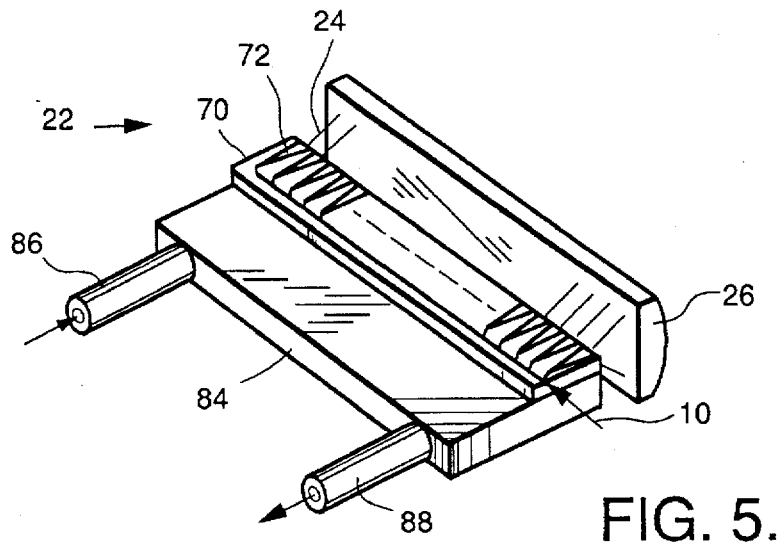
FIG. 5.
FIG. 6.
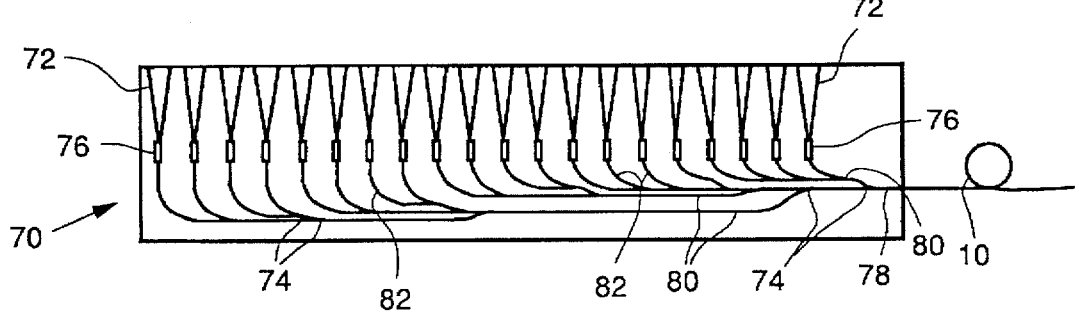
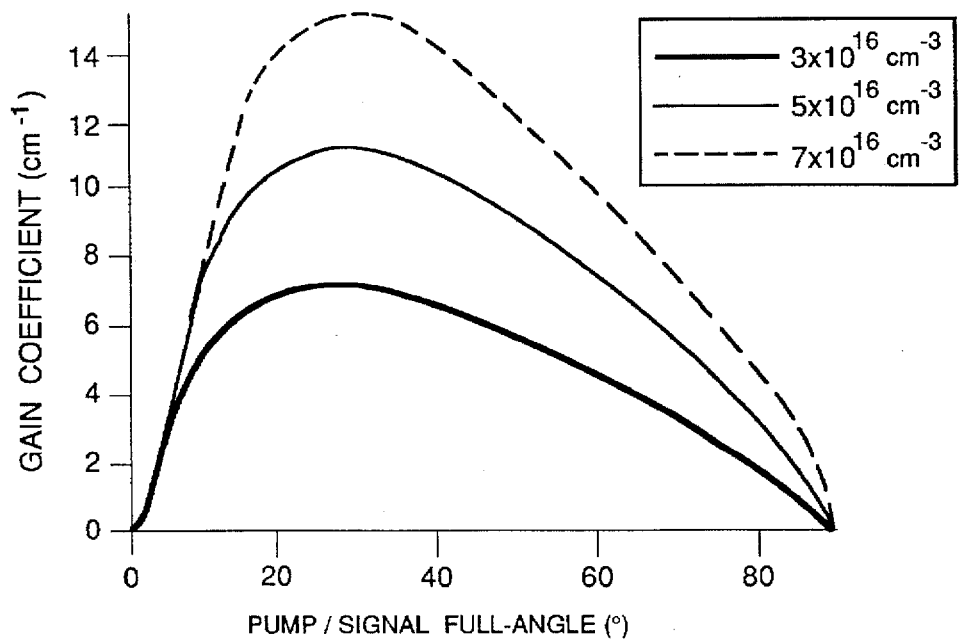
FIG. 7.

OPTICAL AMPLIFICATION SYSTEM WITH NON-ORTHOGONAL SIGNAL AND DISTRIBUTED MULTI-PUMP BEAMS AND PHOTOREFRACTIVE CLEANUP

GOVERNMENT RIGHTS

This invention was made with Government support under Contract F29601-94-C-0191 awarded by the Air Force. The Government has certain rights in this invention.

BACKGROUND OF THE INVENTION

1. Field of the Invention

This invention relates to the amplification of a diffraction-limited optical beam, and more particularly to optical beam amplification using multiple pump beams which separately cross at less than 90° with a signal beam to be amplified.

2. Description of the Related Art

It would be highly desirable to be able to produce a high power diffraction-limited (spatially coherent) beam with a continuous wave (cw) power level significantly above 2 W from a simple diode laser source. High power diffraction-limited beams can presently be obtained from more complicated sources, such as Nd:YAG, doubled Nd:YAG and ion lasers, but their wall plug efficiency is very low. In addition, making their beams diffraction-limited reduces their efficiency, increases their costs for a given power output, and makes them more complicated. Such sources are also not compatible with on-chip integration.

One approach to beam amplification, for both laser diode and other beam sources, is two-wave mixing of a low power diffraction-limited signal beam with a higher power non-diffraction-limited pump beam in a photorefractive mixing medium. Power is transferred from the pump beam to the signal beam, which retains its diffraction-limited quality despite receiving a power transfer from a non-diffraction-limited pump beam. Such systems using BaTiO₃ are described in:

A. E. Chiou and P. Yeh, "Beam cleanup using photorefractive two-wave mixing", *Optics Letters*, Vol. 10, No. 12, pages 621–623 (1985);

A. E. Chiou and P. Yeh, "Laser-beam cleanup using photorefractive two-wave mixing and optical phase conjugation", *Optics Letters*, Vol 11 No 9, pages 461–463 (1986);

W. R. Christian and I. C. McMichael, "Laser beam cleanup at 830 nm", *Proceedings of the SPIE*, Vol. 1060, pages 113–118 (1989); and S. MacCormack and R. W. Eason, "Efficient amplification of a single-mode laser diode by photorefractive beam combination using an injection-locked diode laser array pump", *Optics Letters*, Vol. 15, No. 21, pages 1212–1214 (1990);

W. R. Christian, P. H. Beckwith and I. McMichael, "Energy transfer between injection-locked single-mode diode lasers by two-beam coupling in BaTiO₃", *Optics Letters*, Vol. 14, No. 1, pages 81–83 (1989);

P. H. Beckwith and W. R. Christian, "Two-wave mixing and phase conjugation at 830 nm in BaTiO₃", *Optics Letters*, Vol. 14, No. 12, pages 642–644 (1989);

J. M. Verdiell, H. Rajbenbach and J. P. Huignard, "Efficient Diffraction-Limited Beam Combining of Semiconductor Laser Diode Arrays Using Photorefractive BaTiO₃", *IEEE Photonics Technology Letters*, Vol. 2, No. 8, pages 568–570 (1990); and P. Lambelet, M. Glick, R. P. Salathé and D. Rytz, "Novel Configuration of Two-Wave Mixing of Laser-Diode Radiation in Cobalt-Doped BaTiO₃", *IEEE Photonics Technology Letters*, Vol. 4, No. 9, pages 1041–1043 (1992).

These prior systems operate upon the principle that power transfer from the pump to the signal beam is optimized for a crossing angle between the two beams that is much less than 90°. To facilitate a relatively small crossing angle, both beams enter the same face of the photorefractive mixing crystal. When extraordinary (e)-polarized beams are used in a barium titanate crystal, this geometry geometry optimizes the effective electro-optic coefficient, and thus the gain, through the use of the large tensor components $r_{33}$ and $r_{42}$ of this crystal. While these prior systems are intended to achieve high optical gain, they do not provide for effective distribution of thermal loading. Furthermore, while a highly diffraction-limited signal beam was demonstrated in some experiments, the high power configurations introduce a significant risk of beam fanning, which can drastically distort the signal beam.

In a variation of this approach, described in S. MacCormack and R. W. Eason, "Sequential power transfer between stripes of a diode laser array via photorefractive two-wave mixing in BaTiO₃", *Journal of Applied Physics*, Vol. 67, No. 11, pages 7160–7162 (1990), a linear array of separate laser diodes are coupled to each other through the evanescent field between the laser waveguides. As shown in FIG. 4 of this article, the beams from each of the diodes except one on the end enter a BaTiO₃ photorefractive crystal at right angles to the crystal face. The crystal is cut so that the beam from the end diode (the signal beam) is refracted and crosses each of the other beams (the pump beams) in succession at crossing angles substantially less than 90°. This results in an amplification of the signal beam at each crossing with a pump beam.

In Verdiell et al. U.S. Pat. No. 5,121,400 a signal beam and a number of pump beams are obtained from a single master laser and directed into a single nonlinear crystal, with the signal beam entering one face of the crystal and the pump beams entering another face of the crystal. The pump beams are directed along paths that converge onto the signal beam path within the crystal, with the pump beams overlapping each other at the signal beam and crossing the signal beam at different angles all less than 90°. The beams apparently have extraordinary polarizations, although this is not stated explicitly. This system tends to concentrate the heating at one location within the crystal, and each pump beam provides a different degree of amplification.

In Yeh et al. U.S. Pat. No. 4,761,059 a signal beam and a plurality of pump beams from separate lasers in a phased laser array cross within a nonlinear crystal, although unlike the Verdiell et al. patent all of the beams enter through the same crystal face.

A different type of optical amplification system, in which a signal beam is directed through a series of photorefractive crystals and multiple pump beams are directed through orthogonal faces of the crystals to cross with the signal beam at 90° crossing angles, is proposed in a patent application filed on the same day as the present application, Marvin B. Klein et al., "Hybrid Laser Power Combining and Beam Cleanup System Using Nonlinear and Adaptive Optical Wavefront Compensation", Ser. No. 08/609,199, now abandoned. The pump and signal beams are ordinary (o)-polarized and are both directed 45° to the crystals' C-axes to obtain an amplification of the signal beam at each crossing within the crystals, which are preferably rhodium-doped BaTiO₃ (BaTiO₃:Rh). This system yields an amplified high power diffraction-limited output beam from a single low power laser diode source. However, the gain that is achievable with 90° crossed o-polarized beams is limited, due to a small effective electro-optic coefficient and internal space charge field obtained in crystals with low values of trap density. To maintain a high level of gain a larger electro-optic coefficient and a higher trap density in the photorefractive medium are required, the trap density being preferably about $5-7 \times 10^{16}$ cm$^{-3}$. This trap density is generally associated with a relatively high optical absorption in the crystals.

The properties of BaTiO$_3$:Rh as a photorefractive medium have been discussed in B. A. Wechsler, M. B. Klein, C. C. Nelson and R. N. Schwartz, "Spectroscopic and photorefractive properties of infrared-sensitive rhodium-doped barium titanate", *Optics Letters*, Vol. 19, No. 8, pages 536-538 (Apr. 15, 1994) and T. W. McNamara et al., "Fixing and IR response of doped barium titanate", *SPIE Critical Review Proceedings*, Vol. CR-48, P. Yeh and C. Gu, ed., (1994), pages 100-120. However, BaTiO$_3$:Rh has not been proposed for diffraction-limited beam combining.

SUMMARY OF THE INVENTION

The present invention provides an optical amplification system that yields a high power diffraction-limited output beam from a single low-power laser diode source. The system is compact and yet spreads the pumping power over a relatively large area, thus reducing heating effects. An array of pump beams is used which need only be spectrally rather than spatially coherent. The relaxed specification for the pump beams' spatial mode quality in turn relaxes system requirements such as processing uniformity and time and temperature stability of the pump spatial distribution, which normally must be carefully controlled to produce a diffraction-limited output. The invention also relaxes the positional accuracy required for the pump beams and simultaneously provides high energy extraction and high output power.

These goals are accomplished by directing a diffraction-limited signal beam through a photorefractive medium, preferably a series of photorefractive crystals whose C-axes are parallel to the signal beam, and directing pump beams that do not have to be diffraction-limited into orthogonal faces of the crystals. The pump beams intersect the signal beam at beam crossings that are distributed along the signal beam path within the medium, and at crossing angles that are substantially less than 90°. The pump beams are e-polarized. The signal beam, propagating down the c-axis, has a polarization which is degenerate between ordinary and extraordinary. The requirement for this application is that the signal beam polarization should be in the plane defined by the signal beam and the pump beam. As the signal beam travels through the crystals it is amplified at each pump beam crossing.

In a preferred embodiment, the photorefractive medium is implemented with a series of crystals, and the pump beams are transmitted through a prism prior to entering the crystals. The prism is preferably implemented in a wedge shape, with the crystals aligned parallel to one of its faces and the pump beams entering the prism at another of its faces. After refraction upon entering the crystals, the pump beams preferably intersect the signal beam at crossing angles in the approximate range of 40°-65°. With all of the beams e-polarized and the c-axis of the crystal in the plane of the beams, this produces a substantial gain at each beam crossing. Smaller crossing angles (and thus higher gain) are obtained by allowing the pump beams to bend toward the c-axis by the beam fanning process. The crystals are preferably spaced from the prism and immersed in a coolant having a refractive index that approximates that of the prism to avoid reflections at the prism-coolant interface. A second prism, together with an additional set of pump beam sources, can be provided on the opposite side of the photorefractive crystals to provide additional gain.

The crystals are preferably BaTiO$_3$:Rh, with a trap density in the approximate range of $4-5 \times 10^{16}$ cm$^{-3}$, and an absorption coefficient in the approximate range of 0.1-0.15 cm$^{-1}$.

Propagating the signal beam along the crystals' c-axes inhibits beam fanning of the signal beam, while the beam crossing angles provide sufficiently high gain for efficient energy extraction. The crystals' inclined orientation relative to the prism allows for a greater number of crystals to be used, thus increasing the spatial distribution of the pump power and reducing heating effects. A single laser diode can be used as a source for both the signal beam and the pump beams (generated by amplification of the signal in an amplifier array).

These and other features and advantages of the invention will be apparent to those skilled in the art from the following detailed description, taken together with the accompanying drawings.

BRIEF DESCRIPTION OF THE DRAWINGS

FIG. 2 is a perspective view illustrating the crossing of one of the pump beams with the signal beam within a photorefractive crystal;

FIG. 3 is a perspective view of a preferred master oscillator for the system;

FIG. 4 is a perspective view of a signal beam amplifier and beam forming optics using the system of FIG. 1;

FIG. 5 is a perspective view of a pump beam source used in the system of FIG. 1;

FIG. 6 is a plan view of an optical distribution system used to divide an input pump beam into individual amplified pump beams; and FIG. 7 is a set of graphs showing the system's gain coefficient as a function of pump/signal beam crossing angles and the doping concentration of the photorefractive medium.

DETAILED DESCRIPTION OF THE INVENTION

Figure 1:
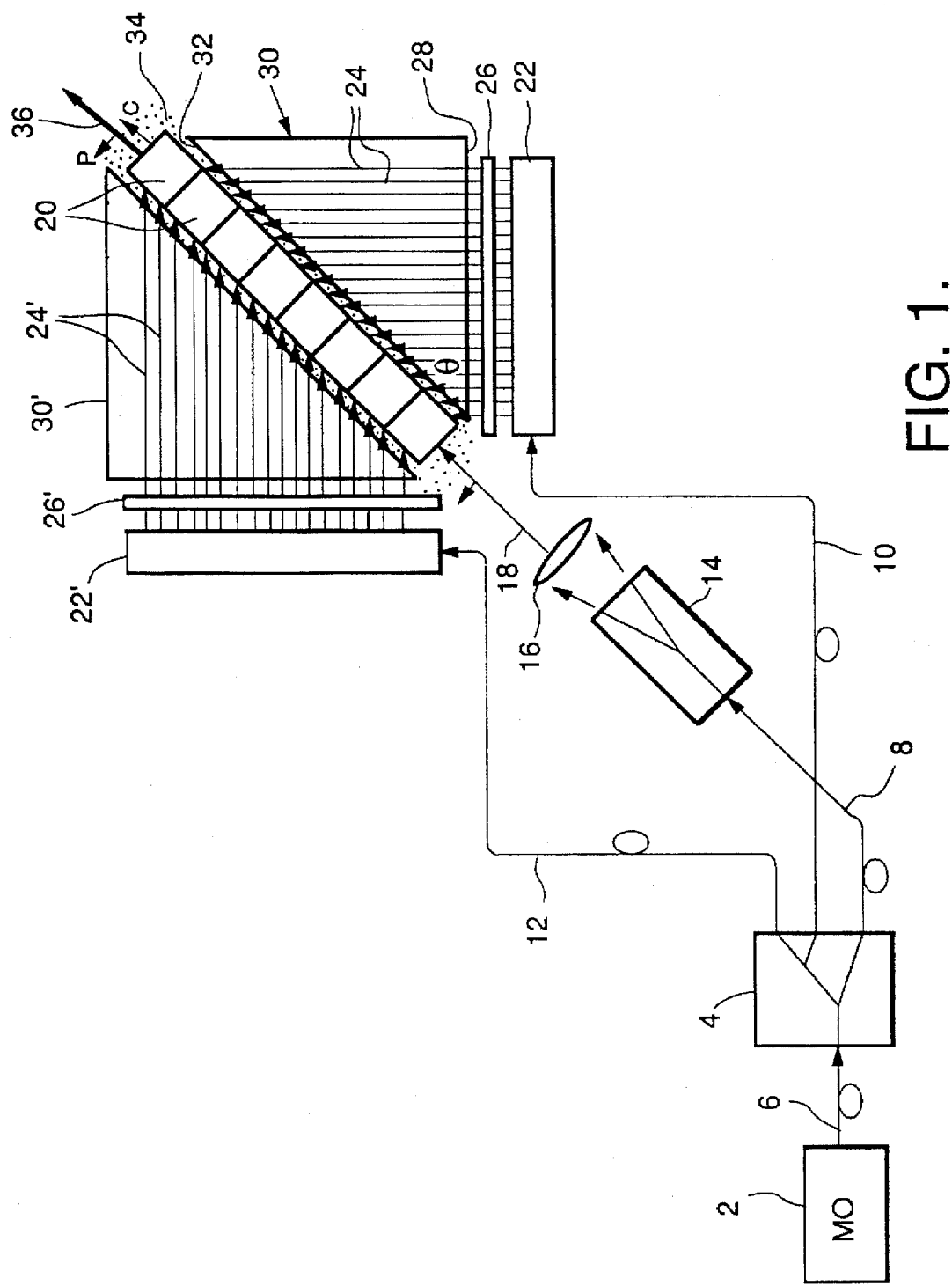
FIG. 1 is a block diagram of an optical amplification system in accordance with the invention.

A preferred implementation of an overall amplification system in accordance with the invention is shown in FIG. 1. A master oscillator 2 produces an amplified optical signal from a single diode laser at a desired frequency, which should have a narrow bandwidth and ideally be at a single frequency. The master oscillator output is delivered to a beam splitter 4 via an optical fiber 6, which is a form of waveguide; the signal could also be transmitted in free space as a beam, with the addition of appropriate optics at each end, or through other convenient optical transmission media. The beam splitter 4 divides the master oscillator source beam, which is diffraction-limited, into a signal beam on an optical fiber 8 and a pump source beam on another optical fiber 10. A third optical fiber 12, which branches off fiber 10 to provide a path for a second pump source beam, is also shown, although the provision of a second pump source beam is optional.

The signal beam on fiber 8 is delivered to a preliminary amplifier 14. The output of the preliminary amplifier is processed through optics 16 which remove astigmatisms and condition the signal beam in order to compensate for fixed phase distortions in the crystal array 20 as well as amplitude distortions induced by the beam coupling process. The goal is to produce an output beam 36 with a plane wavefront and a square "super-Gaussian" intensity profile. The resulting signal beam 18 is injected into a photorefractive medium, preferably a series of photorefractive crystals 20, with a p-polarization and at approximately 90° to the crystal input faces. The crystals are cut so that their C-axes are parallel to the signal beam. Inside the crystals the signal beam propagates approximately along the c-axis and has a polarization which is nominally degenerate between O and e. O and e are defined with respect to the crystalline axis, with O referring to beam propagation with a polarization perpendicular to the crystal's c-axis and e to all other beam propagations, while p and s refer to perpendicular polarizations with respect to a reference frame of the system outside the crystals.

The pump source beam in fiber 10 is delivered to an optical distribution and amplification network 22 that divides and amplifies the pump source into an array of individual pump beams 24. The distribution and amplification network 22 preferably uses an optical distribution system that is discussed below in connection with FIG. 6 to minimize the number of signal splits encountered by each individual pump beam.

The pump beams 24 are collimated in the plane perpendicular to the pump array using a cylindrical lens 26 and are directed preferably at right angles to the input edge 28 of a wedge-shaped prism 30, which has a wedge angle θ that is substantially less than 90°, and approximately equal to 45°. The pump beams are transmitted through the prism's output edge 32, preferably at an angle of approximately 45° to the output edge. Although theoretically the pump beams could enter the crystals 20 directly from the prism, or the prism could be deleted entirely, the crystals are preferably immersed in a coolant 34 indicated by stipling in FIG. 1 and spaced slightly away from the prism's output edge 32. For this purpose a cooling oil is preferably used that has a refractive index matched to that of the prism to minimize reflections at the prism/oil interface. Given a particular refractive index for the prism, present suppliers of cooling oil can design oils with at least an approximately matching index; typical refractive indices for oils are in the range of 1.5–1.7. Suitable prism materials are glass, high refractive index glass, rutile and quartz. A low level of reflection at the prism/oil interface, combined with the typically larger critical angle within the crystals, reduces the risk that the pump beams will induce self-pumped phase conjugation in the crystals. An oil/crystal interface also produces less scattering from crystal surface imperfections than an air/crystal interface.

The pump beams are typically refracted upon entering the crystals 20, and intersect the signal beam 18 within the crystals at a crossing angle that is preferably within the range of about 40°–65°. The crystals line up parallel to the prism's output face 32.

Although the signal beam 18 is near diffraction-limited, this is not required of the pump beams. Within the crystals 20 the pump and signal beams write index gratings via the photorefractive effect; the orientations of the light beams with respect to the c-axis of the crystal are such that the gratings coherently couple energy from the aberrated pump beams into the signal beam. The output 36 from the crystals is a diffraction-limited beam whose spatial and spectral characteristics are identical to those of the signal beam, but which is greatly amplified. Note that the photorefractive beam cleanup process cannot correct for fixed or thermally-induced index changes in the bulk, or fixed distortions on the surfaces of the crystals, which are experienced by the signal beam. Note also that nonuniform pump depletion in the beam coupling process can distort the amplitude of the signal beam. These distortions can be substantially corrected by the conditioning optics 16.

The photorefractive crystals 20 are illustrated as eight separate crystals that are lined up parallel to the prism's angled output edge 32, with the signal beam passing completely through each crystal in turn and parallel to their C-axes. Instead of discrete crystals, it would be possible to operate with a single photorefractive medium designed to produce index gratings in response to p-polarized pump and signal beams (c-axis of the crystal in the plane of the beams) at substantially less than 90° crossing angles to each other. However, multiple crystals are preferred to reduce the size requirement for each crystal. $BaTiO_3$:Rh is the preferred crystal material; it exhibits superior photorefractive properties at both infrared and visible wavelengths, and particularly for high gain applications in the 0.8–1.0 μm region. The preferred Rh doping concentration is approximately 2,000 ppm in the melt. Because of the relatively high gain that can be attained at each beam crossing, the crystal trap densities are preferably only about $4-5 \times 10^{16}$ cm$^{-3}$, which in turn leads to a lower level of absorption and heat generation.

Other photorefractive materials that could be used for infrared wavelengths (approximately 850–950 nm) are ferroelectric oxides such as strontium barium niobate (although no dopants for this material are presently known at wavelengths above 850 nm), Group III–V compound semiconductors such as GaAs or GaP doped with chromium or InP doped with iron, and Group II–VI compound semiconductors such as CdTe or ZnTe doped with vanadium. Alternate materials for visible wavelengths include all of the photorefractive ferroelectric oxides such as strontium barium niobate and other members of the tungsten-bronze family, $KNbO_3$ and $LiNbO_3$.

If a second pump source fiber 12 is used, a second optical distribution and amplification network 22', cylindrical lens 26' and prism 30' are also provided, on the opposite side of the crystals 20 from the primary pump elements. The second pump elements 20', 26' and 30' are arranged and operate in a manner substantially similar to elements 22, 26 and 30, directing a second set of pump beams 24' into the opposite crystal faces from the first set of pump beams. The second set of pump beams intersect the signal beam at angles similar to the first set, and provide additional amplification. Note that the two sets of pump beams do not exchange energy with each other, since the electro-optic coefficient for the resulting gratings is very small.

The beam interaction within one of the crystals 20, taken in isolation, is illustrated in FIG. 2. The signal beam 18 is shown entering an input face 38 of the crystal, while a pump beam 24 enters a crystal pump face 40 that is 90° to the input face 38 (typically each crystal would receive more than one pump beam, but only a single pump beam is illustrated in FIG. 2). The polarizations 18a and 24a of the signal and pump beams is in the plane defined by the beams and the c-axis.

The crystal is cut so that its C-axis is perpendicular to the input face 38 and parallel to the input beam 18 and pump face 40, thus inhibiting fanning of the input beam. For a hole-dominated crystal the c-axis points in the same direction as the signal beam; for an electron-dominated crystal the c-axis orientation is reversed. Upon entering the crystal, the pump beam 24 is refracted by an angle that depends upon the relative refractive indices of the crystal and the prism, and intersects the signal beam 18 at a crossing angle φ. This angle is substantially less than 90°, causing energy to be transferred from the pump beam into the signal beam. Fanning of the pump beam can further reduce φ and improve the energy transfer. The energy transfer is indicated by the pump beam 24 entering the crystal as a thick beam but exiting thin, while signal beam 18 enters the crystal as a thin beam but exits much thicker. The crystals are antireflection coated and may be mounted in a frame (not shown) for heat sinking at the top and/or bottom.

A preferred implementation for the master oscillator 2 is shown in FIG. 3. Since the entire system operates at the same frequency, the master oscillator provides a source optical signal with sufficient power to maintain a good signal-to-noise ratio throughout the system. This is preferably about 1–2 W fiber-coupled, isolated, signal-mode power. The master oscillator includes a monolithic master oscillator/flared amplifier chip 42 upon which a single laser diode 44 operates at the desired frequency, and an integrated flared amplifier 46 which amplifies the diode output. Flared diode amplifiers and master oscillators are well-known.

The chip 42 is mounted on a heat sink 48; its optical output is stigmated and made circular by an acircular cylindrical lens 50, and then collimated by an aspheric lens 52. The beam is then passed through an optical isolator 54 and focused by a lens 56 into the waveguide branching power splitter 4. The outputs from the waveguide splitter are butt-coupled to the polarization-maintaining single-mode fibers 8, 10 and 12.

If desired, the master oscillator could provide source signals for additional amplifier modules by inserting another beam splitter prior to splitter 4, and connecting each of the outputs from the inserted beam splitter to different modules. The amplified outputs from each of the modules could then be combined in a phase-matching operation, such as that described in the above-referred copending Klein et al. application Ser. No. 08/609,199, now abandoned, to yield a net output that combine the powers of each of the individual modules.

Details of a preferred implementation for the signal beam's preliminary amplifier 14 and optics 16 are given in FIG. 4. The signal beam's fiber 8 is butt-coupled to the preliminary amplifier 14. This amplifier is preferably implemented with a single-mode polarization-preserving waveguide that leads to a flared amplifier 58. It can also include an integrated phase modulator (not shown) for purposes of phase matching the amplified signal beam with the outputs of other amplification modules, as described for example in co-pending Klein et al. Ser. No. 08/609,199, now abandoned. The signal beam output is collimated in the direction perpendicular to the signal/pump beam junctions by a spherical lens assembly 60, and focused in the orthogonal direction to a line focus. It is passed through a slit 62 positioned at the line focus, which acts as a spatial filter and removes any residual phase or amplitude perturbations that may have been introduced by the amplifier in the flared direction. By using a line rather than a point spatial filter, the filtered radiation is spread out along the slit and heating and distortion of the spatial filter is avoided. Beyond the filter 62, the beam is collimated by a cylindrical lens 64 into a round, near-Gaussian diffraction-limited beam 66 which is passed through a phase and/or intensity mask 68. The latter element compensates any fixed phase errors in the photorefractive crystals and tailors the beam intensity profile so that the output beam has a square super-Gaussian (rounded top-hat) profile which roughly approximates a square cross section.

The mechanism which produces the pump beams is shown in greater detail in FIGS. 5 and 6. The optical distribution and amplification network 22 is preferably implemented with a bar-shaped semiconductor chip 70 upon which flared amplifiers 72 are formed at the desired operating wavelength (such as 860 nm or 980 nm), integrated with a waveguide distribution network that is shown in detail in FIG. 6. The pump beam fiber 10 from the master oscillator is coupled to the edge of the chip, which allows junction-down mounting of the chip for optimum heat sinking of the amplifiers. The chip length is chosen to limit the power output density to a desired level; a 2 cm chip length for a total of 70 W of pump power gives 35 W per linear cm, which has been demonstrated to be within the bounds for high reliability operation.

Referring to FIG. 6, in the preferred embodiment the master oscillator signal is launched into an integrated waveguide distribution network consisting of Y-waveguide splits 74, curved waveguides, integrated preamplifiers 76 (one for each pump beam) and the flared amplifiers 72, which are fed by respective preamplifiers. The loss from each waveguide split is compensated by actively pumping the distribution network. To minimize the accumulation of spontaneous emissions through the routing network, a binary tree arrangement is used to split the input pump beam so that the input to each amplifier passes through no more than five splitters (for the twenty amplifier array illustrated in FIG. 6).

The input waveguide 78 integrated on the chip is referred to as the "trunk" of the binary tree. A number of waveguide branches 80 are split off from this tree, with most of these branches further split into parallel pairs of subbranches 82 from which the ultimate input beams to the amplifiers are obtained. By following a binary splitting order for the subbranches 82, the maximum number of waveguide splits can be held to m, where m is the lowest whole number that is greater than or equal to $\log_2 n$, and n is the number of ultimate subbranches and pump beams. For example, with the 20-pump system illustrated in FIG. 6, no pump beam will have experienced more than five splits. In fact, a maximum of five splits can be maintained for up to 32 pump beams ($2^5$).

In the example of FIG. 6 the first branch 80a is illustrated as having four linear subbranches, rather than two pairs of binary subbranches. This is because the number of splits experienced by each of the first four pump beams can be kept to not more than five regardless of whether their respective subbranches are binarially or linearly divided. For the remaining branches, however, a binary splitting configuration is preferred.

Because some of the pump signals will have experienced more waveguide splits than others during transit through the distribution network, their optical power levels may be lower. The preamplifiers 76 are preferably implemented so as to balance the intensity levels for all of the pump beams, producing a power level of about 20–30 mW at the input to each flared amplifier 72 in the exemplary embodiment.

The flared amplifiers 72 increase the power of their respective output beams to a level of 3.5–4 W cw in the illustrated embodiment. The output power from individual amplifiers may be adjusted along the bar, e.g., by adjusting the current supplied to each amplifier, to reduce the thermal loading and/or improve the efficiency of energy conversion into the output beam. Although the limit for diffraction-limited outputs from such amplifiers is typically 2–3 W cw, they can be operated to much high powers while remaining spectrally coherent, although with the possible introduction of intensity and/or phase distortions across the beam. However, the photorefractive beam cleanup crystals require only that the pump beams be approximately collimated, and not diffraction-limited. Thus, by using photorefractive beam cleanup, individual amplifiers 72 can be operated at much high power levels than would be the case in a microlensed array architecture.

The operating current necessary to provide 70 W of coherent output is approximately 110A, which will result in a power dissipation of about 150–160 W across the amplifier bar 70. This chip is preferably mounted on a heat sink 84 that dissipates the thermal load while minimizing the junction temperature rise. The heat sink 84 is preferably water cooled, with water entering through an inlet 86 and exiting through an outlet 88 to provide a continuous circulation during operation.

The use of photorefractive beam cleanup makes the output beam insensitive to thermal-related changes in the optical properties of the flared amplifier array, such as changes in astigmatism or thermal shifts in the chip position due to distortion of the heat sink, since the photorefractive gratings automatically readjust to changes in the input beam phase profile, as long as these changes are slow enough for the beam coupling process to follow them. In addition, the amplification system is insensitive to package-related uncertainties in the virtual source position, i.e., bowing of the amplifier chip 70, tilt of the chip with respect to the front of the heat sink, or thermal lensing caused by nonuniformities in bonding. All of these types of process variations alter the phase front of the emitted pump beams and would be extremely difficult to compensate using fixed correction optics such as lenslet arrays, but are automatically corrected in real time by the photorefractive beam cleanup optics. However, wavefront distortions which develop in the signal beam itself (due to thermal distortions, volume inhomogeneities or surface non-uniformities) cannot be corrected by the beam coupling process. The beam cleanup optics allow for a significant relaxation of the design and fabrication constraints for the high power amplification array, thus lowering risk and improving yield.

The gratings that are formed within the photorefractive crystals are characterized by a space charge field and an effective electro-optic coefficient which are much larger than those obtained with the 90° geometry contemplated in copending Klein et al. application Ser. No. 08/609,199, now abandoned. In addition to permitting a lower trap density and an accompanying reduction in absorption, lining up the crystals parallel to the prisms angled exit face 32 results in a longer array of crystals than with the 90° geometry. This yields a higher gain for a given gain coefficient, and also spreads the heating from the pump beams over a larger area.

The invention provides numerous other advantages. Since the pump beams need only be spectrally coherent, with no strict requirement on their spatial mode quality, there is less of a need to control the pump beams' uniformity and their time and temperature stability than with a diffraction-limited pump. Imaging of the pump beams into the photorefractive crystal array is accomplished by a single cylindrical lens which requires a positional accuracy only on the order of 100 micrometers, compared to microlens structures requiring submicrometer positional control. The overall optical efficiency is quite high, and higher power outputs can be achieved by adding additional amplification modules in parallel. The master oscillator and pump beam amplifier can be designed, characterized and operated independently of each other. The use of commercial fiber-coupled components such as isolators and splitters, and semiconductor integrated components such as the flared amplifiers and the optical distribution network for the pump beams, greatly reduces the system complexity.

FIG. 7 presents plots of the calculated gain coefficient for the signal beam at 860 nm as a function of the internal pump/signal beam crossing angle, for trap densities of 3, 5 and $7\times10^{16}$ cm$^{-3}$. The calculated gain coefficient neglects electron-hole competition, which would probably reduce the calculated value by about 25%. With a prism wedge angle of 45°, a glass prism with a refractive index of 1.5 produces beam crossing angles of 63°; a high-index glass with a refractive index of 1.85 produces 56° crossing angles, and a rutile prism produces 40° crossings. With any of these prism materials, larger gain coefficients can be achieved than obtained using o-polarized beams in a 90° geometry.

A demonstration of the experiment that was conducted at 860 nm with a $BaTiO_3$ crystal having 1600 ppm Rh in the melt and a 4.9 mm interaction length confirmed the attainability of large values of gain. An undepleted gain of 14 was measured. Assuming an interaction length defined by the intersection of the cross beams that extends over the full crystal length, the gain coefficient is 5.5 cm$^{-1}$; the actual gain coefficient is probably larger because the effective interaction length is less than the physical length of the crystal. It should be noted that any pump beam fanning will tend to occur in the direction of signal beam propagation, thereby reducing the average pump/signal beam crossing angle and thus increasing the gain coefficient. However, in the actual amplifier at least near the end of its travel through the photorefractive crystals, the signal beam will be much stronger than the pump beam, and this can be expected to erase the noise gratings which lead to pump beam fanning.

While illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An optical amplification system, comprising:
   a photorefractive medium,
   a signal beam source arranged to direct an optical signal beam through said photorefractive medium from a location outside the medium, said photorefractive medium comprising at least one crystal, with each crystal oriented so that its C-axis is substantially parallel to the signal beam, and
   a pump beam source arranged to direct a plurality of optical pump beams through said photorefractive medium from respective locations outside the medium,
   said signal beam being directed along a path outside the medium that is substantially non-parallel to the paths of said pump beams outside the medium, said pump beams intersecting said signal beam at respective beam crossings that are distributed along the signal beam path within the medium, and at beam crossing angles that are substantially less than 90° to amplify the signal beam by a pump beam at each successive beam crossing.

2. An optical amplification system comprising:
   a photorefractive medium,
   a signal beam source arranged to direct an optical signal beam through said photorefractive medium from a location outside the medium,
   a pump beam source arranged to direct a plurality of optical pump beams through said photorefractive medium from respective locations outside the medium, said signal beam being directed along a path outside the medium that is substantially non-parallel to the paths of said pump beams outside the medium, said pump beams intersecting said signal beam at respective beam crossings that are distributed along the signal beam path within the medium, and at beam crossing angles that are substantially less than 90° to amplify the signal beam by a pump beam at each successive beam crossing, and a prism between said pump beam source and said photorefractive medium, said prism arranged to receive said pump beams from said pump beam source along an input edge and to transmit said pump beams to said photorefractive medium through a prism output edge that is angled to said input edge.

3. The optical amplification system of claim 2, wherein said prism's output edge is longer than its input edge and is parallel to said photorefractive medium.

4. The optical amplification system of claim 2, wherein said photorefractive medium is immersed in a coolant and is spaced from said prism by a gap that is flooded with said coolant.

5. The optical amplification system of claim 4, wherein said prism and coolant have approximately equal refractive indexes.

6. The optical amplification system of claim 2, wherein said prism is oriented to receive said pump beams at approximately right angles to its input edge and to transmit said pump beams out at substantially less than right angles to its output edge.

7. The optical amplification system comprising:

a photorefractive medium, a signal beam source arranged to direct an optical signal beam through said photorefractive medium from a location outside the medium, a pump beam source arranged to direct a plurality of optical pump beams through said photorefractive medium from respective locations outside the medium, said photorefractive medium having opposite faces with said pump beams entering through one of said faces, said signal beam being directed along a path outside the medium that is substantially non-parallel to the paths of said pump beams outside the medium, said pump beams intersecting said signal beam at respective beam crossings that are distributed along the signal beam path within the medium, and at beam crossing angles that are substantially less than 90° to amplify the signal beam by a pump beam at each successive beam crossing, and a second pump beam source arranged to direct a second plurality of optical pump beams through the opposite face of said photorefractive medium to intersect said signal beam at respective beam crossings that are distributed along the signal beam path and at beam crossing angles that are substantially less than 90°, and amplify the signal beam at each successive beam crossing.

8. An optical amplification system comprising:

a photorefractive medium, a signal beam source arranged to direct an optical signal beam through said photorefractive medium from a location outside the medium, and a pump beam source arranged to direct a plurality of optical pump beams through said photorefractive medium from respective locations outside the medium, said signal beam being directed along a path outside the medium that is substantially non-parallel to the paths of said pump beams outside the medium, said pump beams intersecting said signal beam at respective beam crossings that are distributed along the signal beam path within the medium, and at beam crossing angles that are substantially less than 90° to amplify the signal beam by a pump beam at each successive beam crossing, said signal beam source generating said signal beam as a diffraction-limited beam, and said pump beam source generating said pump beams as non-diffraction-limited beams.

9. The optical amplification system of claim 1, wherein each crystal has a respective input face and a respective pump face perpendicular to its input face, said crystals arranged for said signal beam to enter them at substantially a right angle to their input faces and for said pump beams to enter the pump faces of respective crystals at substantially less than a right angle.

10. The optical amplification system of claim 1, wherein said signal and pump beams are directed to cross at crossing angles in the approximate range of 40°–65°.

11. The optical amplification system of claim 1, said photorefractive medium comprising $BaTiO_3$:Rh.

12. The optical amplification system of claim 11, wherein said photorefractive medium has a trap density in the approximate range of $4-5 \times 10^{16}$ cm$^{-3}$.

13. An optical amplification system comprising:

a photorefractive medium, a signal beam source arranged to direct an optical signal beam through said photorefractive medium from a location outside the medium, and a pump beam source arranged to direct a plurality of optical pump beams through said photorefractive medium from respective locations outside the medium, said signal beam being directed along a path outside the medium that is substantially non-parallel to the paths of said pump beams outside the medium, said pump beams intersecting said signal beam at respective beam crossings that are distributed along the signal beam path within the medium, and at beam crossing angles that are substantially less than 90° to amplify the signal beam by a pump beam at each successive beam crossing, said signal and pump beam sources generating said signal and pump beams with p-polarizations.

14. The optical amplification system of claim 1, wherein said signal beam source includes a diode laser which initiates said signal beam.

15. The optical amplification system of claim 14, wherein said diode laser produces a source beam, and further comprising a beam splitter which splits said source beam into said signal beam and a pump source beam for said pump beams.

16. An optical amplification system comprising:

a photorefractive crystal having an input face and a pump face at approximately a right angle to each other, and a second pump face parallel to and opposite said pump face, a signal beam source arranged to direct and optical signal beam through said crystal's input face, a pump beam source arranged to direct an optical pump beam through said crystal's pump face to intersect said signal beam at a beam crossing angle that is substantially less than 90° and causes the signal beam to be amplified by the pump beam, and a second pump beam source arranged to direct a second optical pump beam through said second pump face to intersect said signal beam at a beam crossing angle that is substantially less than 90° and causes the signal beam to be amplified by the second pump beam.

17. An optical amplification system comprising:

a photorefractive crystal having an input face and a pump face at approximately a right angle to each other, a signal beam source arranged to direct and optical signal beam through said crystal's input face, and a pump beam source arranged to direct an optical pump beam through said crystal's pump face to intersect said signal beam at a beam crossing angle that is substantially less than 90° and causes the signal beam to be amplified by the pump beam, said signal beam source generating said signal beam as a diffraction-limited beam, and said pump beam source generating said pump beam as a non-diffraction-limited beam.

18. An optical amplification system comprising:

a photorefractive crystal having an input face and a pump face at approximately a right angle to each other, a signal beam source arranged to direct and optical signal beam through said crystal's input face, said crystal oriented with its C-axis substantially parallel to said signal beam, and a pump beam source arranged to direct an optical pump beam through said crystal's pump face to intersect said signal beam at a beam crossing angle that is substantially less than 90° and causes the signal beam to be amplified by the pump beam.

19. An optical amplification system comprising:

a photorefractive crystal having an input face and a pump face at approximately a right angle to each other, a signal beam source arranged to direct and optical signal beam through said crystal's input face, and a pump beam source arranged to direct an optical pump beam through said crystal's pump face to intersect said signal beam at a beam crossing angle that is substantially less than 90° and causes the signal beam to be amplified by the pump beam, said crystal oriented for said signal beam to enter at substantially a right angle to its input face, and for said pump beam to enter at substantially less than a right angle to its pump face.

20. An optical amplification system comprising:

a photorefractive crystal having an input face and a pump face at approximately a right angle to each other, a signal beam source arranged to direct and optical signal beam through said crystal's input face, and a pump beam source arranged to direct an optical pump beam through said crystal's pump face to intersect said signal beam at a beam crossing angle in the approximate range of 40°–65° that causes the signal beam to be amplified by the pump beam.

21. An optical amplification system comprising:

a photorefractive $BaTiO_3$:Rh crystal having an input face and a pump face at approximately a right angle to each other, a signal beam source arranged to direct and optical signal beam through said crystal's input face, and a pump beam source arranged to direct an optical pump beam through said crystal's pump face to intersect said signal beam at a beam crossing angle that is substantially less than 90° and causes the signal beam to be amplified by the pump beam.

22. The optical amplification system of claim 21, wherein said crystal has a trap density in the approximate range of $4–5 \times 10^{16}$ cm$^{-3}$.

23. An optical amplification system comprising:

a photorefractive crystal having an input face and a pump face at approximately a right angle to each other, a signal beam source arranged to direct and optical signal beam through said crystal's input face, and a pump beam source arranged to direct an optical pump beam through said crystal's pump face to intersect said signal beam at a beam crossing angle that is substantially less than 90° and causes the signal beam to be amplified by the pump beam, said signal and pump beam sources generating said signal and pump beams with p-polarizations.

24. An optical amplification system comprising:

a photorefractive crystal having an input face and a pump face at approximately a right angle to each other, a signal beam source arranged to direct and optical signal beam through said crystal's input face, said signal beam source including a diode laser which initiates said signal beam, and a pump beam source arranged to direct an optical pump beam through said crystal's pump face to intersect said signal beam at a beam crossing angle that is substantially less than 90° and causes the signal beam to be amplified by the pump beam.

25. The optical amplification system of claim 24, wherein said diode laser produces a source beam, and further comprising a beam splitter which splits said source beam into said signal beam and a pump source beam for said pump beam.

26. An optical amplification system, comprising:

a first generally wedge-shaped prism having an input edge and an output edge that meet at a wedge angle substantially less than 90°, a plurality of photorefractive crystals having respective input and pump faces that are generally perpendicular to each other, said crystals aligned to receive a signal beam through their input faces in succession and with their pump faces generally parallel to and spaced from the prism's output edge, and a first plurality of pump beam sources arranged to direct a first plurality of generally parallel pump beams to enter said prism through its input edge, exit the prism through its output edge and continue into respective crystals through said crystals' pump faces to intersect a signal beam in said crystals at respective beam crossings that are distributed along the signal beam path, are substantially less than 90° and amplify the signal beam at each successive beam crossing.

27. The optical amplification system of claim 26, wherein said photorefractive medium is immersed in a coolant and is spaced from said prism by a gap that is flooded with said coolant.

28. The optical amplification system of claim 27, wherein said prism and coolant have approximately equal refractive indexes.

29. The optical amplification system of claim 26, wherein said crystals have second pump faces opposite and parallel to said first pump faces, and further comprising a second generally wedge-shaped prism having an input edge and an output edge that meet generally at said wedge angle, with its output edge generally parallel to and spaced from the crystals' second pump faces, a second plurality of pump beam sources arranged to direct a second plurality of pump beams that are generally orthogonal to said first plurality of pump beams to enter said second prism through its input edge, exit the second prism through its output edge and continue into respective crystals through their second pump faces to intersect a signal beam in said crystals at respective beam crossings that are distributed along the signal beam path, are substantially less than 90° and amplify the signal beam at each successive second pump beam crossing.

30. The optical amplification system of claim 26, wherein said pump beam sources generate said pump beams as nod-diffraction-limited beams.

31. The optical amplification system of claim 26, wherein said crystals are oriented with their C-axes substantially parallel to said prism's output edge.

32. The optical amplification system of claim 31, wherein said prism, crystals and pump beam sources are arranged for said pump beams to enter the pump faces of respective crystals at substantially less than a right angle.

33. The optical amplification system of claim 31, wherein said pump beam sources direct said pump beams to cross a signal beam which is transmitting said crystals parallel to their C-axes at crossing angles in the approximate range of 40°–65°.

34. The optical amplification system of claim 26, said crystals comprising $BaTiO_3$:Rh.

35. The optical amplification system of claim 34, wherein said crystals have a trap density in the approximate range of $4-5 \times 10^{16}$ cm$^{-3}$.

36. The optical amplification system of claim 26, wherein said pump beam sources generate said pump beams with p-polarizations.

* * * * *